United States Patent [19]

Danko

[11] 4,362,582

[45] Dec. 7, 1982

[54] METHOD OF PRODUCING MICROPOROUS JOINTS IN METAL BODIES

[75] Inventor: Joseph C. Danko, Danville, Calif.

[73] Assignee: The United States of America as represented by the United States Department of Energy, Washington, D.C.

[21] Appl. No.: 668,743

[22] Filed: Sep. 12, 1967

[51] Int. Cl.³ .............................................. B22F 5/00
[52] U.S. Cl. ...................................... 148/127; 148/39; 228/193; 228/231; 376/456
[58] Field of Search .................... 29/487, 498; 148/34, 148/39, 127; 176/91; 228/193, 231

[56] References Cited

U.S. PATENT DOCUMENTS

| | | | |
|---|---|---|---|
| 3,157,539 | 11/1964 | Dreher | 148/127 |
| 3,158,732 | 11/1964 | Kazakov | 29/498 X |
| 3,170,234 | 2/1965 | Tarr | 29/498 X |
| 3,188,732 | 6/1965 | Feduska | 29/498 X |
| 3,197,858 | 8/1965 | Feduska | 29/498 X |
| 3,205,573 | 9/1965 | Seal | 29/498 X |
| 3,259,971 | 7/1966 | Gagola | 29/498 |
| 3,261,724 | 7/1966 | Ulam | 148/127 X |

OTHER PUBLICATIONS

Guy—"Elements of Physical Metallurgy", Addison-Wesley Publishing Co., MC.-Mass 1951, pp. 397–404.

Primary Examiner—Brooks H. Hunt

[57] ABSTRACT

Tungsten is placed in contact with either molybdenum, tantalum, niobium, vanadium, rhenium, or other metal of atoms having a different diffusion coefficient than tungsten. The metals are heated so that the atoms having the higher diffusion coefficient migrate to the metal having the lower diffusion rate, leaving voids in the higher diffusion coefficient metal. Heating is continued until the voids are interconnected.

3 Claims, No Drawings

METHOD OF PRODUCING MICROPOROUS JOINTS IN METAL BODIES

The invention described herein was made in the course of, or under, Contract No. AT(04-3)-189, Project Agreement No. 32, with the U.S. Atomic Energy Commission.

BACKGROUND OF THE INVENTION

This invention relates primarily to pore-forming in metal bodies, and in particular to methods of producing microporous bodies with tungsten.

In the development of thermionic reactors, where the emitter contains a fissile fuel material, the generation of fission products gases becomes a problem. The emitter body, which is spaced apart from the collector by a very narrow gap, tends to enlarge and change dimensionally in reaction to the increase in internal gas pressure due to the generation of fission product gases. The enlargement of the emitter, if left unchecked, will, in a time shorter than the life of the fissile fuel, cause the emitter to come in contact with the collector, thus shorting out the converter cell and reducing the power-generating capacity of the thermionic reactor.

Venting of the emitter must be achieved without releasing any particles of fissile fuel which would detrimentally contaminate the emitter surface, collector surface, or cesium vapor, or detrimentally increase the space charge effect.

The present invention concerns the process for forming porous openings in the cladding of the emitter which acts somewhat in the manner of a filter to permit the flow of fission product gases, but prevents the release of fissile fuel particles outside the emitter cladding. To be effective, such pore openings and passages must be microscopic in size, e.g., the pore openings must be large enough to permit the molecules and atoms of the fission product gases to pass through, but small enough to retain the fissile fuel molecules and particles.

SUMMARY OF THE INVENTION

Basically, the process of this invention comprises bonding together two metals having different diffusion coefficients to define a planar interface, heating the two metals including the interface, to a temperature below the melting point of both metals until the voids formed upon migration of atoms of the higher diffusion rate into the metal having the lower diffusion rate is interconnected.

The resulting product is a body of two metals bonded together to define an interface, and having microscopic channels along one side of the interface.

It is therefore an object of this invention to provide a process for making a microporous joint in a metal body.

It is a further object of this invention to provide a process for making a microporous vent in a high melting temperature metal.

It is another object of this invention to provide a process for making a microporous vent at the interface of the joint between two metals having different diffusion coefficients.

It is yet another object of this invention to produce a microporous metal body by a process using metals having different coefficients of diffusion, and heating said metals to a temperature below their melting point.

Other and more particular objects of this invention will be manifest upon study of the following detailed description.

DESCRIPTION OF THE PREFERRED EMBODIMENT

The basic steps of the process of this invention comprise, first, bonding together two metals having different coefficients of diffusion by such techniques as brazing, friction welding, compression welding, coextrusion or the like, so that a bonded interfaced joint is formed between the two metals. Second, heating the two bonded metals to a temperature below their melting point, but high enough to cause the atoms of the metal having the higher diffusion coefficient to migrate into the other metal having the lower diffusion coefficient within a reasonable period of time, as well as permit the voids left by the migrating atoms to become interconnected.

In the present invention, tungsten is used as the metal having the lower diffusion coefficient, while molybdenum, tantalum, niobium (Columbium), vanadium, rhenium, and alloys of these metals are used as the metals having the higher diffusion coefficient. Such alloys include molybdenum-50 weight % rhenium, and niobium-vanadium.

EXAMPLE 1

A tungsten cylinder about 0.95 inches long and a wall thickness of about 0.04 inches, and a tungsten disc having the same outside diameter of about 0.46 inches as the cylinder and thickness of about 0.04 inches, were machined so that the disc fitted as an end cap to the cylinder.

After machining, the cylinder and disc were chemically cleaned. A wire annulus, having inside and outside diameters equal to those of the cylinder, and of an alloy consisting of molybdenum with 50 weight % rhenium, was sandwiched between the end of the tungsten cylinder and the disc end cap.

The assembly was then placed in a vacuum environment at a pressure of about $10^{-6}$ torr, and heated to a temperature of 2600° C. for a period of 15 minutes in order to melt the molybdenum-50 weight % rhenium wire and braze the cylinder-end cap assembly together. The temperature was then lowered to from 2400°-2500° C., still maintaining the vacuum environment, and held at that temperature for a period of 25 hours. The porosity which developed for this method was measured by helium mass spectrometer leak detector (sensitivity of $10^{-10}$ cc helium/sec) and the morphology was determined by metallographic analysis. The leak rate was measured to be $10^{-6}$–$10^{-5}$ cc/sec.

It was also found that tungsten, alloyed with 25 weight % rhenium, would also produce microporous openings.

EXAMPLE 2

The cylinder and disc end cap of Example 1 were fabricated from tungsten-25 weight % rhenium, and the same steps as Example 1 were performed, using a molybdenum 50 weight % rhenium wire braze. The assembly was heated to a temperature of 2600° in a vacuum environment of $10^{-6}$ torr for 15 minutes to melt the wire and braze the assembly together. The assembly was then maintained at 2400°-2500° C. in the vacuum environment for 25 hours. The porosity which developed using these materials was measured by helium mass spectrometer leak detector (sensitivity of $10^{-10}$ cc helium/sec) and the morphology was determined by metallographic analysis. The leak rate was measured to be $10^{-6}$–$10^{-5}$ cc/sec.

In general, it has been found that the metals which can be used successfully in the process of this invention are located in the periodic table around tungsten and are more commonly referred to as the High Temperature Refractory Group of Metals. These metals all have lower melting points than tungsten, and as a result, all have diffusion coefficients greater than tungsten.

Although the foregoing embodiments have been described in detail, there are obviously many other embodiments and variations in configuration which can be made by a person skilled in the art without departing from the spirit, scope, or principle of this invention. Therefore, this invention is not to be limited except in accordance with the scope of the appended claims.

I claim:

1. A process for making a microporous vent at the interface of a joint between two metals having different diffusion coefficients comprising the steps of:

forming an intimate contact interface joint between two metals, one of the two metals having a higher diffusion coefficient than the other of the two metals and selected from the group consisting of molybdenum, tantalum, niobium, vanadium, rhenium, molybdenum-50 weight % rhenium, and niobium-vanadium, the other metal of the two metals having a lower diffusion coefficient being selected from the group consisting of tungsten and tungsten-25 weight % rhenium, heating the thus joined metals to a temperature below their melting point but high enough to cause atoms of the one of the two metals having the higher diffusion coefficient to migrate into the other of the two metals having the lower diffusion coefficient, and maintaining the joint metals in the heated condition for a period of time sufficient for voids resulting from the migration of atoms to become interconnected, thereby producing microporous vents at the interface of the joint between the two metals.

2. The process as claimed in claim 1, wherein the one of the two metals having the higher diffusion coefficient is molybdenum-50 weight % rhenium, and the other of the two metals having the lower diffusion coefficient is tungsten-25 weight % rhenium, and wherein the temperature is maintained for about 25 hours in the rangee of about 2400°–2600° C.

3. The process as claimed in claim 1, wherein the step of forming the intimate contact joint between the two metals is accomplished by a bonding technique selected from the group consisting of brazing, friction welding, compression welding, and coextrusion, to provide a bonded interface joint between the two metals.

* * * * *